United States Patent [19]

Karlsson

[11] 4,290,564
[45] * Sep. 22, 1981

[54] SPRING-OPERATED REVERSABLY ROTATABLE BODY

[76] Inventor: Hans I. R. Karlsson, Vintervagen 17, 175 40 Jarfalla, Sweden

[*] Notice: The portion of the term of this patent subsequent to Dec. 14, 1993, has been disclaimed.

[21] Appl. No.: 740,269

[22] Filed: Nov. 9, 1976

Related U.S. Application Data

[62] Division of Ser. No. 517,676, Oct. 24, 1974, Pat. No. 3,997,126.

[30] Foreign Application Priority Data

Oct. 30, 1973 [SE] Sweden ............................ 14694/73

[51] Int. Cl.³ ............................................ B65H 75/48
[52] U.S. Cl. ...................................... 242/107; 185/37; 242/107.4 R
[58] Field of Search ............................ 242/107–107.7; 185/37, 39; 267/156; 280/807; 297/475–478

[56] References Cited

U.S. PATENT DOCUMENTS

| | | | |
|---|---|---|---|
| 59,689 | 11/1866 | Weed | 242/107.2 |
| 924,669 | 6/1909 | Johnson | 185/37 |
| 2,923,491 | 2/1960 | Fischer et al. | 242/107 |
| 3,294,446 | 12/1966 | Fontaine | 242/107.4 R X |
| 3,997,126 | 12/1976 | Karlsson | 242/107 |

Primary Examiner—John M. Jillions
Attorney, Agent, or Firm—Fred Philpitt

[57] ABSTRACT

This invention involves a spring operated, reversibly rotatable body having a surface on which a flexible, elongated object, e.g. a wire or a band, can be wound, said body being connected with a spring which is stretched by the rotation of the body during the unwinding of said elongated object. The improvement includes a transmission between the elongated object and the spring, said transmission having a gearing ratio which is varied during the rotation of the body. In a preferred embodiment, the transmission comprises two rotatable cones, said cones being connected by means of a traction wire which is wound on the surfaces of said cones. One of the cones is connected with the spring and the other with an output shaft.

The aim of the improvement is to provide a means by which the tractive force caused by said spring in the elongated object during the rotation of said body will remain constant. The improvement is particularly useful in retractable safety belts to obtain a constant force in the belt strap during extension of the belt.

5 Claims, 5 Drawing Figures

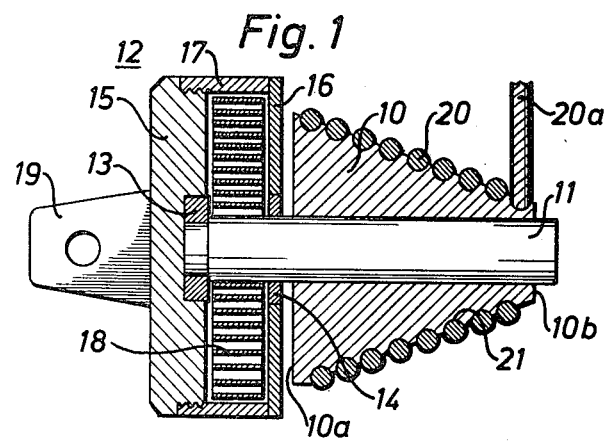
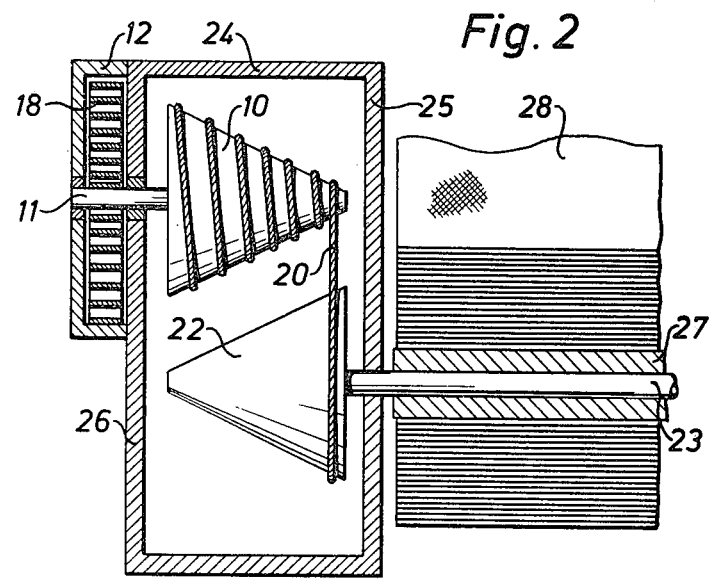
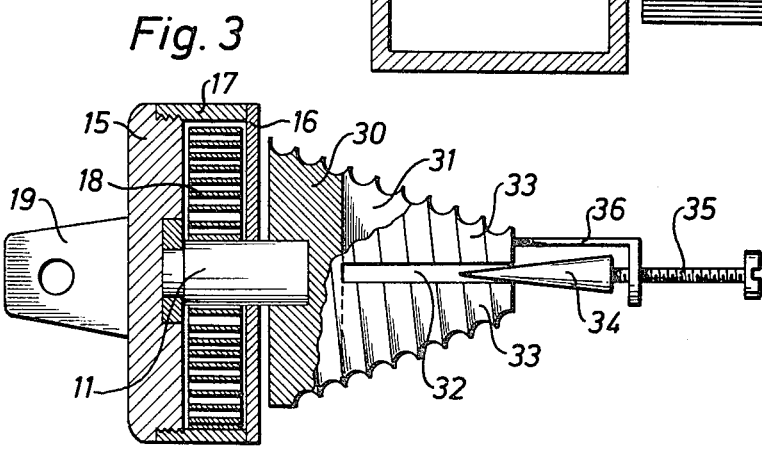

SPRING-OPERATED REVERSABLY ROTATABLE BODY

RELATED APPLICATION

This application is a division of Ser. No. 517,676 filed Oct. 24, 1974 and the benefits of 35 USC 120 and 121 are claimed relative to this earlier application. Ser. No. 517,676 is now U.S. Pat. 3,997,126.

The present invention is related to an improved spring operated, reversibly rotatable body which is provided with a surface on which a flexible, elongated object can be wound and which is connected to a spring arranged to be stretched by the rotation of the body during the unwinding of the elongated object from the body. The aim of the improvement is to make possible a constant tractive force provided by the spring in the elongated object during the rotation of the body. Spring operated, reversibly rotatable bodies can be used for instance for winding and unwinding of elongated objects such as wires, bands, flexible tubings, and so on, which have to be extended when used and which have to be rewound after use. The spring is often, but not necessarily always, arranged to automatically provide the winding or rewinding of the elongated object on the rotatable body.

The invention can particularly be used in connection with safety belts for vehicles, particularly motor cars. Such safety belts are today normally arranged to be automatically retracted, at least partly, into a house or cover when they are not in use. This is obtained by winding a strap of the safety belt on a spindle which is caused to rotate by means of a coil spring which has been stretched to a sufficient extent by the rotation of the spindle during the extension of the strap.

A disadvantage of the safety belts of the type now in use, the so-called retractable belts, is that the tractive force exerted by the spring on the strap of the belt increases as the strap is unwound from the spindle and the spring is stretched. This is due to the fact that in the known devices the shaft of the spindle is directly connected to the coil spring and that the tension in such a spring increases successively, when the spindle rotates during the unwinding of the strap. A further contributing factor is that the diameter of the strap coil decreases successively during the unwinding of the strap, thereby causing the lever between the point where the strap is unwound and the axis to successively decrease. The tractive force provided by the spring in the strap is thus small at the beginning of the unwinding operation but is then growing larger and larger. When the safety belt is in use, the larger portion of the strap has been extended, and then the tractive force provided by the spring in the strap has reached such a large value that the safety belt causes a comparatively strong pressure over the chest of the person in the belt. This pressure is uncomfortable for the person in the belt and this is a main reason for the fact that the safety belts in the motor cars to a large extent are not used during driving. Therefore, it is highly desirable to eliminate the cause for the uneasy feeling connected with the use of the safety belts today so that the safety belts will be used more frequently.

In this context, it should be observed that the problem cannot be solved only be decreasing the tractive force provided by the spring in the strap, as a minimum tractive force of a certain level is necessary for winding of the last part of the strap of the belt which is to be wound on the spindle. For this reason, the springs of the retractable safety belts now in use are generally pre-stretched.

The main object of the invention is to provide a device which makes it possible to equalize the tractive force exerted by the spring on the wound elongated object as the spring is stretched during the unwinding of the object, so that the tractive force caused by the spring has always a desirable and acceptable momentary value.

A few embodiments of the invention will be described more in detail below with reference to the accompanying drawings, wherein:

FIG. 1 shows a section of a winding device;

FIG. 2 shows, partly in section, an embodiment of the invention which permits equalizing the tractive force caused by the spring;

FIG. 3 shows an embodiment which makes it possible to adjust the surface of the rotatable body with the aim of obtaining the desired equalization of the tractive force;

Figure 4:
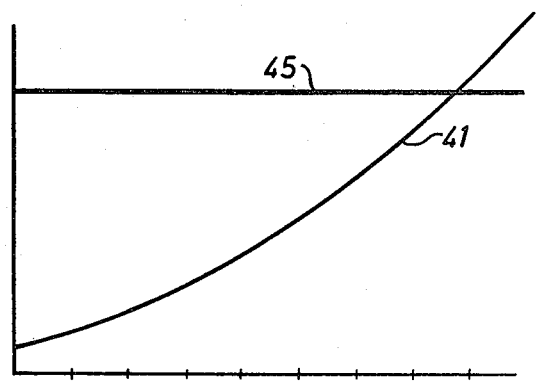
FIG. 4 is a graph illustrating the difference between an increasing tractive force and a constant tractive force.

In the embodiment shown in FIG. 1, a body 10 is positioned on a shaft 11 which is rotatably mounted in bearings so that the body 10 can be caused to rotate in both directions. One end of the shaft 11 extends into a cover 12 and is rotatably mounted in bearing 13, 14 in two opposite walls 15, 16 of the cover. The two walls 15, 16 are connected through a cylindrical casing 17 so that a closed cylindrical cover is formed. A coil spring 18 is positioned between the walls 15, 16 of the cover and the inner turn of the coil spring is fixed to the shaft 11 and the outer turn of the coil spring is fixed to the surrounding cylindrical wall or casing 17. The spring is so positioned that it is stretched during the rotation of the shaft in one direction, so that the energy stored in the spring then can be used for turning the shaft in the opposite direction back to the starting position. Furthermore, the cover 12 is provided with a mounting means 19 having a bore to facilitate fastening of the cover to a supporting surface.

The rotatable body 10 is so designed that a wire 20 can be wound on the body and then unwound from the body. One end of the wire is fixed to the body 10, and the wire is then wound around the body from one end surface 10a to another end surface 10b, i.e. in the FIGURE from the left end surface to the right end surface, where the free end 20a of the wire leaves the body. The wire is so wound that the coil spring is stretched during the rotation of the body when pulling the free end of the wire outwards. When the tractive force outwards in the wire ceases, the tension of the spring will cause the wire to be rewound on the rotatable body.

The rotatable body 10 is designed substantially in the shape of a cone. Due to this shape the wire 20 will be unwound during the unwinding operation from a point which will be moved along a generatrix on the envelope surface of the cone in such a way that the point of unwinding will be positioned at a successively increasing distance from the axis of rotation of the body, thus making the lever acting during the rotation of the shaft by pulling the wire outwards longer and longer. Thus, by choosing a suitable slope of the generatrix in relation to the axis of the rotatable body, the successively increasing tension of the spring can be compensated, so that the retractive force caused by the spring is maintained at a desirable or acceptable value during the complete unwinding operation.

In order to obtain an even distribution of the wire over the surface of the cone the cone is provided with a helical groove 21 of suitable width which runs from the top of the cone to the base of the cone and in which the wire can be positioned so that the different turns of the wire on the surface of the cone are prevented from sliding towards the top of the cone.

By changing the shape of the rotatable body the tractive force in the wire caused by the spring can be given a desired value in each point along the surface of the rotatable body during the unwinding of the wire. However, for practical reasons, the embodiment shown in FIG. 1 will give only rather limited variation possibilities. Therefore, the embodiment shown in FIG. 2 has been developed for the applications where larger variations of the tractive force in the wire have to be provided for a satisfying operation.

In the embodiment shown in FIG. 2 the embodiment according to FIG. 1 has been provided with a further rotatable body 22 which is positioned on an output shaft 23. The two rotating bodies 10, 22 are positioned in a common cover 24, and the shafts 11, 23 of the two bodies extend through opposite walls 25, 26 of the cover. The shaft 11 of the body 10 is connected with the coil spring 18, and the shaft 23 of the body 22 is provided with a spindle 27, on which an elongated object in the shape of a band 28, e.g. a strap in a safety belt for motor cars, is wound. The two rotatable bodies, 10, 22 are connected through the traction wire 20, one end of which is fixed to the body 10 and the other end of which is fixed to the body 22 and which is mainly wound on the body 10 when the spring is unstretched. When pulling the strap 28 from the spindle 27 the body 22 is caused to rotate, so that the wire 20 is wound on this body during a simultaneous stretching of the coil spring 18. When the strap is loosened, the body 22 is caused to rotate in opposite direction by the operation of the spring, so that the strap 28 is automatically rewound on the spindle 27.

By using two rotatable bodies 10, 22, which both have surfaces for winding the wire having a distance from the axis of rotation which varies along the axis of rotation, the tractive force caused by the spring in the elongated object during the winding and unwinding of the object, respectively, can be maintained constant. In the embodiment of FIG. 2, in which the shaft 11 first is given a higher speed than the shaft 23 and then is given a lower speed than the shaft 23, there is no difficulty in obtaining a tractive force in the elongated object from the spring which remains constant during the complete unwinding operation. This design is particularly convenient when the invention is applied to automatic safety belts for motor cars.

FIG. 4 shows a plot of the tractive force in e.g. a strap in a safety belt as a function of the number of revolutions which the rotatable body on which the strap is wound has turned around its axis of rotation. The line 41 illustrates the situation in the previously known safety belts, in which the rotatable body consists of a cylindrical spindle and the coil spring is directly attached to the spindle. The tractive force in the strap caused by the spring thus increases successively as the strap is unwound from the spindle and the spindle turns around its axis. Line 45 illustrates a constant tractive force from the spring.

It is evident from what has been said above that the shape of the surfaces of the rotating bodies is decisive for the tractive force from the spring in the elongated object. However, it is often very difficult to find out in advance exactly which shape these surfaces should have so as to obtain the equal force result, as some of the influencing factors can only be calculated approximately in advance. It is therefore highly desirable to design the device in such a way that a certain adjustment can be made in connection with practical tests. A design which makes such adjustment possible is shown in FIG. 3. The conically designed, rotatable body 30 is at its top provided with two crossing slots 31, 32, so that the conical body at the top will consist of four portions 33, which are resilient in relation to each other and two of which are shown in the FIGURE. These portions can be moved from each other, so that the circumference of the rotatable body at the top increases, by forcing a conical body 34 into the center of the slots by means of a screw 35. The screw 35 is rotatably mounted in an angle bar 36 which is attached to a portion 33 of the rotating body. The angle bar is preferably to some extent resilient, so that the tension between the screw and the angle bar, when the top is expanded, can be decreased by the resilient property of the angle bar. By moving the conical body 34 in relation to the rotatable body 30 the shape of the rotatable body can be changed within certain limits, thus giving the possibility of adjusting or readjusting the tractive force of the spring.

Figure 5:
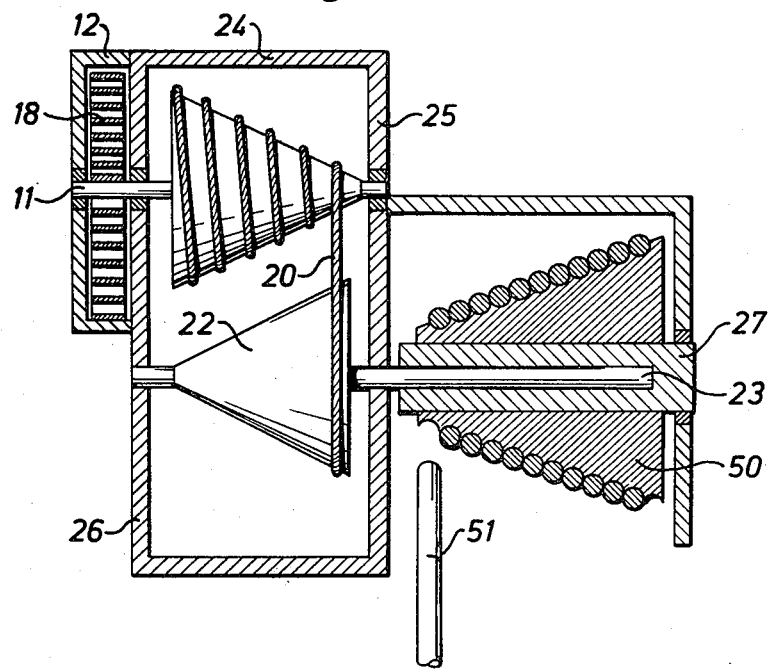
FIG. 5 shows another embodiment of the invention.

In FIG. 5 a further development of the embodiment according to FIG. 1 is shown. In this embodiment is a combination of the embodiments according to FIGS. 1 and 2, the cylindrical spindle 27 in FIG. 2 has been replaced by a conical body 50, the shape of which agrees with that of the body 10 in the embodiment according to FIG. 1. This combination will give a still better possibility of attaining a constant tractive force in the elongated object, which in the embodiment according to FIG. 5 is a wire or rope 51. Also this embodiment can be used in connection with safety belts, provided that the strap in the safety belt is connected to the wire or the rope 51.

The operation of the device and the advantages of the device as compared with the previously used devices in connection with retractable safety belts for motor cars can easily be understood by the following comparison. In the previously known devices the coil spring has been attached directly to the shaft of the spindle on which the strap in the safety belt is wound. When the strap has been extended so much that the spindle has turned a full revolution, it is evident that the spring has been stretched one revolution for which work a certain tractive force has been required in the strap during the extending operation. If a device according to the present invention has been inserted, e.g. according to FIG. 2, there is a varying speed gear between the spindle and the spring shaft which means that when the strap in the beginning of the extending operation has been extended so much that the spindle has turned a full revolution, the spring has been stretched several revolutions, which means that more work has been done and that a larger tractive force has been required in the strap. When the spindle during the end of the extending operation turns one revolution, the spring is stretched less than one revolution due to the changed speed gear, which means that less work has been done and that the required tractive force has therefore been less. In this comparison the change of diameter in the strap coil and the change in spring tension during the extending operation has not been dealt with, as these factors change in the same way in both cases. From the comparison made above it is evident that the force which the strap exerts on a person in the safety belt can be maintained substantially constant when a device according to the present invention is used.

Thus, the present invention will make it possible to obtain a constant tractive force from the spring in the wound elongated object during the course of unwinding and winding, respectively, in close agreement with the requirements for different fields of application. The present invention has also the advantage that a substantially shorter spring can be used in the spring cover and that the requirements on the properties of the spring can be reduced. A shorter spring in combination with reduced requirements on the properties of the spring means lower manufacturing costs for the spring.

While only a few embodiments of the invention have been described and shown, it is evident that a great number of different embodiments and modifications are possible within the scope of the invention. The surfaces of the rotatable bodies can for instance have curved generatrices. The surfaces may consist of friction material or elastic material, e.g. rubber, plastics, foam rubber. In such a case the groove can be omitted, which results in a more efficient use of the surface, so that smaller rotating bodies can be used.

Furthermore, it is possible to use other types of springs than the one shown on the drawings and to use chains or other flexible traction means instead of the shown traction wire.

The device according to the present invention has been described in connection with safety belts, but many other application fields are possible, as already indicated in the introductory portion of the specification.

I claim:

1. A spring operated winding device which comprises in combination:
   (a) a rotatable output shaft that is mounted so that it is reversibly rotatable, and a reversibly rotatable input shaft mounted parallel to said rotatable output shaft,
   (b) an elongated flexible member disposed concentrically around said rotatable output shaft so that when said rotatable output shaft is rotated in one direction said flexible member is in a wound condition and when said rotatable output shaft is rotated in the opposite direction said flexible member is in an unwound condition,
   the surface of said output shaft upon which said elongated flexible member is disposed having a tapered configuration, said elongated flexible member forming one layer on said surface and being unwound from the top towards the base of said surface,
   (c) a spring member having one end connected to said reversibly rotatable input shaft, said spring member being arranged to be stretched by the rotation of said output shaft during the unwinding of said elongated flexible member from said output shaft,
   (d) means interconnecting said rotatable input shaft with one end of said rotatable output shaft, said means including
      (1) a first tapered body having a base portion and a top, said first tapered body being drivingly connected to said rotatable output shaft in both directions of rotation,
      (2) a second tapered body having a base portion and a top mounted on said rotatable input shaft, the taper of said second tapered body being disposed opposite to the taper of said first tapered body,
      (3) a traction wire having one end attached to said base portion of said first tapered body, the other end attached to said base portion of said second tapered body, and the intermediate portion wound around the exterior surfaces of said first and second tapered bodies so that the rotation of the rotatable output shaft in one direction results in winding of the traction wire around said first tapered body and a stretching of said spring member so that said rotatable output shaft can then be caused to rotate in the opposite direction by releasing the tension of said spring member, whereby the slope of the generatrix of said tapered bodies is such that the tractive force required to unwind said flexible member from said rotatable output shaft will be equalized over the course of said unwinding.

2. A device according to claim 1 wherein said tapered bodies each have a conical configuration.

3. A device according to claim 1 wherein said elongated flexible member is the strap of a safety belt.

4. A spring operated winding device which comprises in combination:
   (a) a rotatable output shaft that is mounted so that it is reversibly rotatable, and a reversibly rotatable input shaft mounted parallel to said rotatable output shaft,
   (b) an elongated flexible member disposed concentrically around said rotatable output shaft so that when said rotatable output shaft is rotated in one direction said flexible member is in a wound condition and when said rotatable output shaft is rotated in the opposite direction said flexible member is in an unwound condition,
   (c) a spring member having one end connected to said reversibly rotatable input shaft, said spring member being arranged to be stretched by the rotation of said output shaft during the unwinding of said elongated flexible member from said output shaft,
   (d) means interconnecting said rotatable input shaft with one end of said rotatable output shaft, said means including
      (1) a first tapered body having a base portion and a top, said first tapered body being drivingly connected to said rotatable output shaft in both directions of rotation,
      (2) a second tapered body having a base portion and a top mounted on said rotatable input shaft, the taper of said second tapered body being disposed opposite to the taper of said first tapered body,
      at least one of said tapered bodies being split into a least two portions and a pointed member is adjustably mounted with respect to the opening of said split so that the pointed end can be inserted into said split opening and modify the taper of said tapered body,
      (3) a traction wire having one end attached to said base portion of said first tapered body, the other end attached to said base portion of said second tapered body, and the intermediate portion wound around the exterior surfaces of said first and second tapered bodies so that the rotation of the rotatable output shaft in one direction results in winding of the traction wire around said first tapered body and a stretching of said spring member so that said rotatable output shaft can then be caused to rotate in the opposite direction by releasing the tension of said spring member, whereby the slope of the generatrix of said tapered bodies is such that the tractive force required to unwind said flexible member from said rotatable output shaft will be equalized over the course of said unwinding.

5. A device according to claim 4 in which the pointed member is a cone which is attached to a screw movably mounted in an angle bar attached to said tapered body.

* * * * *